United States Patent Office 3,640,922
Patented Feb. 8, 1972

3,640,922
STABLE AQUEOUS DISPERSIONS
David P. Sheetz, Midland, Mich., assignor to The Dow Chemical Company, Midland, Mich.
No Drawing. Filed Apr. 3, 1969, Ser. No. 813,333
Int. Cl. C08d 7/18; C08f 47/16
U.S. Cl. 260—4 R       16 Claims

ABSTRACT OF THE DISCLOSURE

Aqueous colloidal dispersions having improved stability are prepared by adsorbing a polymerizable surfactant, such as sodium allyl α-sulfopalmitate, on the surface of particles dispersed in aqueous media, such as in a preformed latex, and polymerizing in place the adsorbed surfactant. Ordinarily an amount of polymerizable surfactant to provide from about 50 percent to about 100 percent coverage of the particles is used.

BACKGROUND OF THE INVENTION

This invention relates to aqueous colloidal dispersions of substantially water-insoluble particles and especially of organic polymers, commonly called latexes, and more especially to a process for improving the stability thereof.

The requirement for a surface-active material in synthetic latex compositions has been recognized from the first preparation. Primarily, the suitable surface-active materials have been compounds which are added to the aqueous phase in an emulsion polymerization process. Often additional amounts also are used after polymerization to provide further stabilization to coagulation. Other latex products have been prepared from polymers prepared by methods not requiring use of a surfactant, or emulsifier, with subsequent conversion to aqueous dispersions by the use of solvents, water, surfactants, etc.

Methods have also been developed such as United States Pat. No. 3,108,979, and United States Pat. No. 2,914,499 wherein small proportions of specific water-soluble monomers, which in themselves are not surfactants, are copolymerized in an emulsion system with monomers to provide some surface activity on the polymer itself in a process which does not require added emulsifiers to produce latexes which are stable to coagulation.

A method for preparing aqueous emulsions of vinyl-acetate polymers has been disclosed in United States Pat. No. 3,219,608 in which allyl sulfosuccinates are used as the emulsifier during emulsion polymerization of the monomers.

SUMMARY OF THE INVENTION

It has been discovered, and that discovery is the subject of this invention, that aqueous colloidal dispersions having unexpectedly increased stability are provided by adsorbing a polymerizable surfactant onto substantially water-insoluble particles dispersed in aqueous media and subsequently polymerizing in place the adsorbed polymerizable surfactant.

DESCRIPTION OF THE PREFERRED EMBODIMENTS

In one embodiment of the invention a preformed latex is used as a starting material. The preformed latexes are not limited to any particular type. There may be used natural rubber latex or any of the many known synthetic latexes, i.e., aqueous colloidal dispersions of water-insoluble synthetic organic polymers, of which it is desired to improve stability, especially mechanical stability. Generally, the polymeric constituent consists of polymers of neutral monomers and copolymers of such monomers not having any substantial proportion of hydrophilic groups, primarily because they are more apt to be lacking in stability and to require improvement in that property; although the process may be used if desired where such hydrophilic groups are present in the polymer.

Typically, such latexes are obtained by emulsion polymerization of the constituent monomers. Ethylenically unsaturated monomers which are thus polymerized are represented by, but not restricted to, the alkenyl aromatic compounds, i.e., the styrene compounds; the derivatives of α-methylene monocarboxylic acids such as the acrylic esters, acrylic nitriles and methacrylic esters; derivatives of α,β-ethylenically unsaturated dicarboxylic acids such as maleic esters; unsaturated alcohol esters; conjugated dienes; unsaturated ketones; unsaturated ethers; and other polymerizable vinylidene compounds such as vinyl chloride and vinylidene bromide. Specific examples of such ethylenically unsaturated compounds are styrene, α-methylstyrene, ar-methylstyrene, ar-ethylstyrene, α,ar-dimethylstyrene, ar,ar-dimethylstyrene, ar,ar-dimethylstyrene, vinylnaphthalene, hydroxystyrene, methoxystyrene, cyanostyrene, acetylstyrene, monochlorostyrene, dichlorostyrene, and other halostyrenes, divinylbenzene, methyl methacrylate, ethyl acrylate, butyl acrylate, hexyl acrylate, 2-ethylhexyl acrylate, lauryl methacrylate, phenyl acrylate, acrylonitrile, methacrylonitrile, acrylanilide, ethyl α-chloroacrylate, ethyl maleate, vinyl chloride, vinyl bromide, vinylidene chloride, vinylidene bromide, vinyl methyl ketone, methyl isopropenyl ketone, vinyl ethyl ether, 1,3-butadiene, isoprene and the like.

The polymerizable surfactants applicable to the process of this invention are ethylenically unsaturated compounds which possess the inherent capability of decreasing the surface tension of water, exhibit a critical micelle concentration at 25° C. in pure water of less than 0.5 mole per liter and structurally have a hydrophobic portion which is predominantly hydrocarbon and a hydrophilic portion which may be anionic, cationic or non-ionic. These polymerizable surfactants ordinarily are soluble in water to an extent of at least 1 percent by weight at 25° C. and at a concentration of 0.1 percent by weight in water are capable of reducing the air/water surface tension to less than about 40 dynes per centimeter.

Thus the polymerizable surfactants differ from ordinary surfactants in having on each molecule an ethylenically unsaturated group which is polymerizable by free-radical catalysis under emulsion polymerization conditions. This invention, however, is not directed to new polymerizable surfactants per se but rather to the use of any polymerizable surfactant in the manner described elsewhere in this specification to produce a latex having good dispersion stability and to the products thus obtained.

One class of polymerizable cationic surfactants consists of monomer compounds of the formula

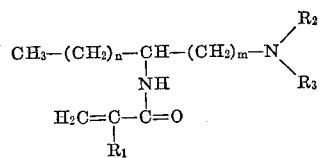

where $R_1$ represents H or $CH_3$; $R_2$ and $R_3$ each represent H, an alkyl group, containing from 1 to 18, and preferably no more than six carbon atoms, or an alkaryl group wherein the alkyl portion contains no more than 2 carbon atoms and the nitrogen atom of the amino group is attached to an aliphatic carbon atom of the alkaryl group; where $m$ is an integer from 2 to 18; $n$ is an integer from 0 to 18, and were $m$ plus $n$ ranges from 10 to 18. These polymerizable compounds can be prepared by contacting an amine corresponding to the formula

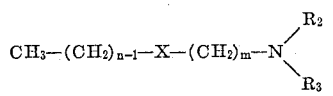

where X is a divalent organic radical chosen from the group consisting of

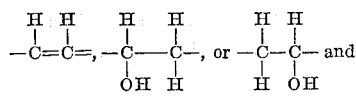

$R_2$, $R_3$, $m$ and $n$ are the same as indicated previously with acrylonitrile or methacrylonitrile in the presence of a strong acid, such as concentrated sulfuric acid. The reaction mixture is maintained at a temperature usually from about 20° C. to about 50° C. and agitated, such as by stirring, for a sufficient period of time to allow a substantially complete reaction to occur. The reaction mixture is admixed with water and the crude product, a salt of the monomer compound corresponding to the acid employed, usually in the form of a yellow waxy compound, is filtered out. The strong acids employed in the method may consist of strong mineral acids, such as sulfuric or phosphoric acid. About 90 to 100 percent acids are preferred and 97 percent sulfuric acid was employed in the examples of preparation of the novel compounds described herein. The crude product is usually alkalized with a strong base, such as, for example, sodium hydroxide, and taken up in an inert solvent such as, for example, methylene chloride. The product monomer amine is precipitated out of the solvent solution by the addition of a non-polar solvent, such as n-hexane.

Unsaturated and hydroxy amines such as, for example, hydroxystearylamines, octadecenylamines, N-substituted hydroxystearylamines and N-substituted octadecenylamines may be employed as the amine starting material in the preparation of the polymerizable surfactants. Other specific amines include, for example, 3-octadecenyldiethylamine, oleylbenzylamine, oleylmethylamine, 7-hydroxystearylmethylamine, 5-octadecenyl-tert-butylamine, 4-dodecenyldimethylamine, 5-hydroxydodecylamine, 6-tetradecenylamine, 8-eicosenylamine and other like amines which correspond to the formula as previously set forth.

The molar ratio of the initial reactants preferably is maintained at about 1:5:5 (starting amine compound: nitrile compound:acid) respectively. Higher or lower molar ratios are operable, however, they may affect the yield and purity of the product.

Other polymerizable cationic surfactants corresponding to the formula

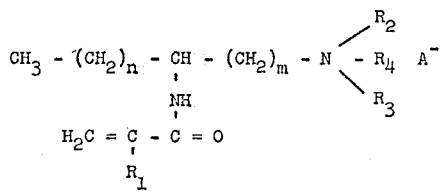

wherein $R_1$, $R_2$, $R_3$, $m$ and $n$ are the same as previously indicated, $R_4$ is H or a lower alkyl group, preferably containing from 1 to 5 carbon atoms, and $A^-$ is an anion of a salt forming acid can be prepared from the above noted surfactants by a further reaction thereof with a salt forming acid or a quaternary ammonium salt-forming compound such as ethyl chloride, methyl bromide, and amyl iodide. The salt-forming acids include, for example, hydrochloric acid, hydrobromic acid, sulfuric acid, toluene sulfonic acid, nitric acid, acetic acid and the like. Salts of the monomer compound include, for example, hydrochloric salts, hydrobromide salts, hydrogen sulfonic salts, toluene sulfonic salts, nitric acid salts, acetic acid salts and other like salts of salt forming acids. Quaternary ammonium salts of the monomer compound include, for example, ethylchloride salts, methylbromide salts, pentyliodide salts and the like.

Another class of polymerizable cationic surfactants consist of the monomer compounds of the formula

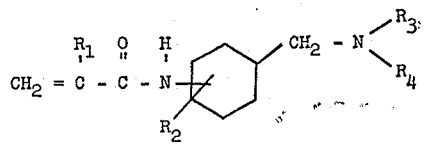

wherein $R_1$ and $R_2$ represent H or $CH_3$; $R_3$ and $R_4$ each represent H, an alkyl group containing from 1 to 18 and preferably no more than 6 carbon atoms, or an alkaryl group containing no more than 2 carbon atoms in the alkyl portion and wherein the nitrogen atom of the aminomethyl group is attached to an aliphatic carbon atom of the alkaryl group; wherein the aminomethyl group is preferably located on the second or third carbon atom of the cyclohexyl ring from the acrylamido group and wherein the $R_2$ group is preferably attached to the same carbon atom of the cyclohexyl ring as is the acrylamido group.

The monomer compounds are prepared by contacting an amine corresponding to the formula

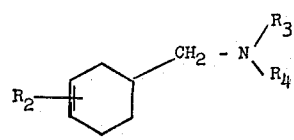

where $R_2$, $R_3$, and $R_4$ are the same as indicated hereinbefore, with acrylonitrile or methacrylonitrile in the presence of a strong acid such as, for example, sulfuric acid. The reaction mixture is usually maintained at a temperature below 40° C. and agitated, such as by stirring, for a sufficient period of time to allow a substantially complete reaction to occur. The reaction product mixture is then usually added to an ice and water mixture and unreacted nitrile compounds are extracted with an inert solvent, such as, for example, methylene chloride. The crude aqueous product mixture containing the salt of the monomer compound corresponding to the acid employed, is usually alkalized with a strong base, such as sodium hydroxide, and unreacted amines are separated from the monomer compounds by washing the product mixture with an amine soluble solvent such as, for example, n-hexane.

Examples of starting amines which may be employed herein consist of 1-methyl-3(and 4)-(aminomethyl)cyclohexene,
3(and 4)-(aminomethyl)cyclohexene
and substituted amines such as
1-methyl-3(and 4)-(diethylaminomethyl)cyclohexene,
1-methyl-3(and 4)-(octadecylaminomethyl)cyclohexene,
1-methyl-3(and 4)-(di-tert-butylaminomethyl)cyclohexene,
3(and 4)-(diethylaminomethyl)cyclohexene,
3(and 4)-(methylpropylaminomethyl)cyclohexene,
1-methyl-3(and 4)-(methylpropylaminomethyl)cyclohexene,
1-methyl-3(and 4)-(ethylpentylaminomethyl)cyclohexene,
1-methyl-3(and 4)-(methyloctadecylaminomethyl)cyclohexene, 3(and 4)-(octadecylaminomethyl)cyclohexene and other like cyclohexenyl methylamino compounds.

The temperature during the initial addition of the reactants preferably should be less than 40° C. The reaction itself can be carried out at about 20° to 50° C. after all the reactants have been mixed together. Preferably the temperature should not exceed 40° C. at any time during the reaction or purifying steps, especially during the addition of the base, since the product may polymerize. Polymerization inhibitors may be used to prevent the polymerization of the monomer compounds during the initial preparation steps.

Reaction time varies accordingly with the temperature at which the reaction proceeds. It has been observed that no exotherm has existed 2 to 3 hours after the reactants have been completely mixed, indicating a corresponding reaction time.

The strong acids employed in the method of the present invention may consist of strong mineral acids, such as sulfuric or phosphoric acid. About 90 to 100 percent strong acids are preferred, and in the examples herein of the preparation of the novel compounds 97 percent sulfuric acid was employed.

The molar ratio of the initial reactants may vary from about 1:1,2:2 to 1:3:6, (methylaminocyclohexene compounds:nitrile compounds:acid), respectively. Molar ratios of less than about 1:1.2:2 are not desirable because the mixtures are too viscous and cannot be stirred effectively.

The reaction ordinarily goes to about 95 percent completion. There is some loss of product because of the solubility of the initial reactant amine in water. Most of the loss of the product occurs during the step of the process where the unreacted starting amine is extracted out of the aqueous phase with an inert solvent. This loss of product can be kept at a minimum by saturating the aqueous phase with an alkali metal sulfate such as, for example, $Na_2SO_4$.

Salts of the monomer compound corresponding to the formula

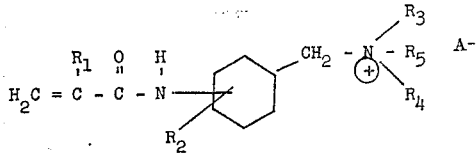

wherein $R_1$, $R_2$, $R_3$ and $R_4$ are the same as previously indicated and where $R_5$ represents H or a lower alkyl group, preferably containing from 1 to 5 carbon atoms, and $A^-$ represents an anion of a salt forming acid are parts by weight, dry basis of the latex polymer.

Salt forming acids include, for example hydrochloric acid, hydrobromic acid, sulfuric acid, toluenesulfonic acid, nitric acid, acetic acid and other like salt forming acids. Lower alkyl halides as employed herein to prepare the novel quaternary ammonium salts of the monomer compound usually contain from 1 to about 5 carbon atoms and include, for example, ethylchloride, methylbromide, pentyliodide and the like. These salts are considered to be within the scope of the present invention and may be prepared by dissolving the novel monomer compounds, as previously described, in an aqueous solution of the salt forming acid, or for example in an aqueous solution of a lower alkyl halide.

Polymerizable anionic surfactants also are operable in the practice of this invention. One sub-class of such surfactants is similar to the above-described cationic surfactants except that the hydrophilic group, i.e., the

or the

group, is replaced by an anionic group such as carboxyl or carboxyl salt group, e.g., alkali metal, ammonium, or low molecular weight amine carboxylate salt groups. Illustrative polymerizable anionic surfactants are the acrylamido and methacrylamido fatty acid compounds described and claimed in U.S. Pat. No. 2,701,809, incoporated herein by reference. Especially pertinent are the compositions of claim 11 thereof. Other pertinent passages are found at col. 1, lines 48–80; col. 2, lines 1–6, 15–24; col. 3, lines 1–5, 45–60 especially Examples 9, 12, 16 and 17 as to the latter passage.

Other polymerizable anionic surfactants are represented by allyl-α-sulfopalmitic acid, allyl-α-sulfostearic acid and the alkali metal salts, such as the sodium or potassium salts, and the ammonium and low molecular weight amine salts of such acids.

Still other polymerizable anionic surfactants are the styryl emulsifying agents. Illustrative such compounds which are operable in the practice of this invention are the acids and salts described and claimed in U.S. Pat. No. 2,868,814, incorporated herein by reference. Especially pertinent are the acids and salts of claims 1, 2 and 3 thereof, such as compounds of the structures

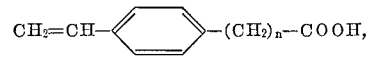

where $n$ can be from 4 to 16,

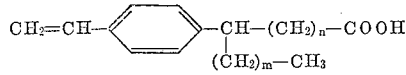

where $n$ can be from 4 to 12 and $n+m$ can be from 4 to 16, and salts thereof. Especially pertinent passages in the patent are found at col. 1, lines 45–68 and at col. 3, lines 16–50. A further disclosure of the same kind of polymerizable surfactants is given in U.S. Pat. No. 2,874,151, also incorporated herein by reference. Also disclosed therein are similar materials except that, for the carboxyl or carboxylic salt hydrophilic group, there is substituted a sulfate or sulfonate group, especially in their salt form, such as the sodium, potassium and ammonium salts. Also useful are similar compounds where

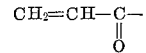

is substituted for $CH_2=CH-$. Especially pertinent passages of U.S. Pat. No. 2,874,151 are found at col. 1, lines 31–69; col. 2, lines 1–9 and 15–57; and col. 4, lines 37–72.

Still other polymerizable anionic materials represented by the formula $$R''-CO_2-Q-SO_3M$$

in which $R''$ is vinyl or alpha-substituted vinyl, Q is a divalent hydrocarbon radical having its valence bonds on different carbon atoms and M is a cation, are described and claimed in U.S. Pat. No. 3,024,221, incorporated herein by reference. Such compounds are polymerizable surfactants operable in the practice of this invention when Q is sufficiently hydrophobic. For use in the present invention Q usually has at least 8 and preferably from 12 to 18 carbon atoms. Especially pertinent passages in the patent are found at col. 1, lines 21–72; col. 2, entire, col. 3, entire; col. 4, lines 1–47 and claims 1, 6 and 12.

Polymerizable non-ionic surfactants likewise are operable in the practice of this invention. One representative subclass of such non-ionic surfactants are the polyoxyethylene derivatives of the various polymerizable surfactants described above which contain a carboxylic acid, i.e., —COOH, group. Such derivatives which are particularly desirable for use in the present invention are those which have an average of from about 3 moles to about 20 moles of ethyleneoxy units per mole of carboxylic acid groups or equivalent compositions, that is, polymerizable surfactants in which the hydrophilic group is

—COO—(CH₂CH₂O)ₙH in which $n$ averages from 3 to 20. Some polymerizable non-ionic surfactants which are operable in the practice of this invention, i.e., the polyoxyethylene esters of p-styrylundecanoic acid, are claimed in U.S. Pat. No. 2,868,814, claim 4.

Another subclass of polymerizable non-ionic emulsifiers which are used in this invention has the formula

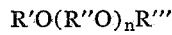
R'O(R''O)ₙR''' wherein R' is alkyl, cycloalkyl, aryl, aralkyl, or alkaryl and has at least 6 carbon atoms, R" is an alkylene having from 2 to 4 carbon atoms with the proviso that at least 10 percent by weight of the R"O units are $CH_2CH_2O$ units, R'" is vinyl or allyl, and $n$ is a number from 5 to 100. When R'" is allyl, these surfactants are prepared by reacting in benzene or toluene solution at a temperature from about 40° C. to about 100° C., optionally at elevated pressure, an alcohol of the formula R'O(R"O)ₙH, wherein R', R" and $n$ are as shown above, with an allyl halide, such as allyl chloride or allyl bromide, in the presence of an alkali metal or alkali metal hydroxide. When R'" is $CH_2=CH-$, the surfactant is prepared in a similar manner by reacting in benzene or toluene solution at a temperature from about 120° C. to about 200° C. an alcohol of the same formula with acetylene in the presence of an alkali metal or an alkali metal hydroxide.

The polymerizable surfactants described above are illustrative but not limiting examples of surfactants which may be used in the practice of this invention. The requirements generally are that the operable materials must be surfactants in the monomeric state and also must be polymerizable. The passage in U.S. Pat. No. 2,874,151 (incorporated by reference supra) at col. 1, lines 31–68 and col. 2, lines 1–9 and 15–54 summarizes their general characteristics.

In carrying out the process of this invention, the polymerizable surfactant as heretofore described is blended with the substantially water-insoluble particles in aqueous media. The amount of polymerized surfactant is that quantity which is sufficient to produce from about 50 to about 100 percent, and particularly at least 70% coverage of the particles. For example, when the particles are polymer particles in a preformed latex, to determine the amount of polymerizable surfactant for that particular latex, a preliminary test is run to determine the amount considered to represent "100 percent coverage" for that latex. By the amount of surfactant for "100 percent coverage" is meant the quantity in parts by weight which can be adsorbed on the particle surfaces of 100 parts by weight, dry basis of the latex polymer.

This quantity is determined by a soap titration method. Soap titration is based on the principle that added surfactant will be adsorbed on the polymer particles until the surface is covered by a layer of film, monomolecular in thickness. While the concentration of soap in the aqueous phase increases with increasing coverage of the particles, at a point just beyond complete coverage, the concentration of surfactant in the aqueous phase (the free-surfactant, or non-micellar surfactant) will not increase further, if the critical micelle concentration is low, because any further surfactant which is added will be incorporated into micelles. Surface tension measurements are indicative of the relative concentration of free surfactant in the latex since surface tension varies inversely with the amount of free surfactant in the aqueous phase. Hence, a plot of surface tension vs. amount of surfactant shows the point where added surfactant no longer reduces surface tension. That point is the end point of the titration and indicates the amount of surfactant required to exceed the critical micelle concentration of the surfactant plus the amount to produce 100 percent coverage of the latex. Where the critical micelle concentration of the surfactant is negligibly small compared to the amount required for full coverage of the latex (as it is with most of the polymerizable surfactants used in this invention), the end point noted above can be considered the "100 percent coverage" amount. If the critical micelle concentration is not negligibly small an appropriate adjustment can be made. The percent coverage in a particular preparation can then be determined by the equation:

$$\text{Percent coverage} = \frac{\text{parts by weight of surfactant used} \times 100}{\text{parts of surfactant required for 100 percent coverage}}$$

The dispersed preformed particles on which the polymerizable surfactant is to be adsorbed may contain unpolymerized monomers, especially non-ionic monomers. The particles, especially the particles of the preformed latexes described supra, may consist of more than one polymeric species and may contain substantially water-insoluble materials such as plasticizers.

After the polymerizable surfactant, or mixture of surfactants, is adsorbed on the particles to the desired percent coverage, the surfactant is polymerized in situ by free-radical catalysis usually by the addition of a material such as sodium persulfate, which is a free-radical catalyst, and by agitation at an elevated temperature substantially in the same manner and for the same time as in usual emulsion polymerization. Such temperatures and times are represented by, but not restricted to, from about 50° C. to about 100° C., and from about 2 hours to about 30 hours.

The advantageous character of the process of this invention is indicated, for example, by measurement of the mechanical stability of latexes prepared by the novel method. The degree of such stability is indicated by the stability index. The stability index is a measure of stability according to the rate of coagulation and indicates the resistance of the latex to formation of coagulum under some shearing stress, e.g., stirring, shaking or rubbing. The stability index is defined as the time in minutes required to coagulate one percent of the solids in a latex sample under specified and predetermined conditions. The method used to determine the stability index was as follows:

A measured sample of the latex at a specified solids content is subjected to a constant shearing stress for a predetermined length of time, usually 30 minutes, at a predetermined temperature. The coagulum is separated by filtration, dried and weighed. The stability index is then calculated from these results. In the examples below each stability index was determined on the latex at 40 percent solids, at a temperature of 30° C. and at a stirring rate of 2700 r.p.m. except as otherwise indicated.

The following examples are given to illustrate more clearly the principle and practice of this invention to those skilled in the art and are not for the purpose of limitation. Throughout this specification and claims, all parts and percentages are by weight unless otherwise indicated.

EXAMPLES 1–3

A latex is prepared by emulsion polymerization of 60 parts of n-butyl acrylate, 36 parts of styrene and 4 parts of methyl methacrylate using as the only emulsion stabilizer, 0.75 part of 2-sulfoethyl methacrylate. The latex has a solids content of 48.25 percent, an average particle diameter of 0.143 micron and a pH of 2.5. The stability index is 3.8 minutes for this latex, hereinafter identified as Latex 1A. By the titration method described above it is found that 3.2 percent of the sodium salt of allyl α-sulfopalmitate is required for 100 percent coverage of the latex particles according to the description given above. The critical micelle concentration (CMC) in pure water at 25° C. is found to be 0.0018 percent by weight. To each of separate portions of the above-described latexes is added sufficient sodium allyl α-sulfopalmitate, as a 10 percent aqueous solution, to provide the desired degree of coverage as shown in Table I, and sufficient water is then added to reduce the solids content to 40 percent. The surface tension is determined for each and the results are shown in Table I in the column entitled "Surface Tension Before Polymerization." The sodium allyl α-sulfopalmitate is polymerized in situ by placing the mixture in a polymerization vessel, adding 0.2 percent of hydrogen peroxide, based on the solids content of the latex, purging with nitrogen, sealing the reaction vessel and agitating the mixture for 22 hours at 70° C. The surface tension of each of the resulting products is measured and the results are shown in Table I under the heading "Surface Tension After Polymerization." In separate experiments it is determined that polymerized sodium allyl α-sulfopalmitate does not lower the water-air surface tension. Material 1A (not an example of the invention) is included in the table for comparative purpose and is the preformed latex to which no sodium salt of allyl α-sulfopalmitate is added.

TABLE I

| Example No. | Coverage, percent | Surface tension before polymerization, dynes/cm. | Surface tension after polymerization, dynes/cm. |
| --- | --- | --- | --- |
| 1 | 30 | 47.0 | 59.0 |
| 2 | 70 | 39.0 | 55.7 |
| 3 | 100 | 33.4 | 52.9 |
| 1A [1] | 0 | 65.0 | 65.0 |

[1] Not an example of the invention.

TABLE II

| | | Stability index | |
| --- | --- | --- | --- |
| Example No. | Coverage, percent | Before polymerization, minutes | After polymerization, minutes |
| 1 | 30 | 19 | 715 |
| 2 | 70 | 26 | 42 |
| 3 | 100 | 26 | 70 |
| 1A [1] | 0 | 3.8 | 3.8 |

[1] Not an example of the invention.

The stability indexes of the products from Examples 1, 2 and 3 as well as of the Latex E are shown in Table II.

EXAMPLE 4

To another portion of Latex 1A is added a sufficient quantity of the sodium salt of allyl α-sulfopalmitate to provide 58 percent coverage of the latex particles. To the resulting product is added 0.2 percent, based on the solids content of the latex, of hydrogen peroxide and the mixture is agitated at 70° C. in a nitrogen atmosphere for 22 hours. The stability index of the latex product is determined and the results are shown in Table 3 as Example 4.

For comparison with Example 4 there are also shown in Table 3, stability indexes for two materials which are not examples of the invention, i.e., 4A and 4B.

To prepare comparative material 4(A) the monomeric sodium salt of allyl α-sulfopalmitate is partially polymerized to obtain a product which is 77 percent polymer and 23 percent monomer. This product is added to Latex 1A in amounts calculated to give 75 percent coverage of the latex particle (i.e., 58 percent coverage with polymer and 17 percent coverage with monomer). The stability index of the resulting latex composition is determined and the results are shown in Table III as Product 4A (not an example of the invention). Product 4B (also not an example of this invention) is another portion of Latex 1A to which a sufficient amount of the sodium salt of allyl α-sulfopalmitate is added to provide 17 percent coverage of the latex particles. The stability index is determined on the product (4B) with no in situ polymerization.

TABLE III

| Example No. | Mono SPA,[1] percent | In situ polymerized SPA,[1] percent | Prepolymerized SPA,[1] percent | Stability index, minutes |
| --- | --- | --- | --- | --- |
| 4 | 0 | 58 | 0 | 30 |
| 4A [2] | 17 | 0 | 58 | 7.8 |
| 4B [2] | 17 | 0 | 0 | 9.0 |

[1] SPA=Sodium salt of allyl α-sulfopalmitate.
[2] Not an example of the invention.

EXAMPLE 5

A mixture of 9-(and 10) acrylamidostearic acid is prepared from 4 moles of acrylonitrile and 1 mole of oleic acid in presence of 4.7 moles of 95 percent sulfuric acid with the reaction being carried out at a temperature of from 20–30° C. The product is isolated by solvent extraction, i.e., 5 extractions with carbon tetrachloride and 1 with cyclohexane. The critical micelle concentration in pure water at 25° C. of the purified product is found to be 0.018 percent by weight. There is also prepared a latex of the same composition of latex 1A having a particle size of 0.132 micron, a solids content of 45.9 percent, a pH of 9.3 and a stability index of 5 minutes. A sufficient quantity of the sodium salt of 9-(and 10-) acrylaminostearic acid to provide 80 percent coverage is added to the latex. The stability index is found to be 29 minutes. In situ polymerization at 70° C. of the thus adsorbed monomeric material, using potassium persulfate as the initiator, provides a product having a stability index of 40 minutes.

EXAMPLE 6

A sufficient amount of the ammonium-salt of 9-(and 10-) acrylamidostearic acid to provide 65 percent coverage is added to a latex of a copolymer of 60 percent by weight of styrene and 40 percent butadiene having a solids content 51.7 percent, an average particle diameter of 0.24 micron, and a stability index of 0.30 minute. After in situ polymerization of the thus adsorbed surface active material, the stability index of the latex is found to be 46 minutes.

EXAMPLE 7

The sodium salt of 9-(and 10-) acrylamidostearyl sulfate is prepared from 3 moles of acrylonitrile and one mole of oleyl alcohol in the presence of 6 moles of concentrated sulfuric acid at a temperature of 20–30° C. After purification of the crude product by treatment with an ice/water mixture then with fresh water, extraction with n-butanol and distillation under partial vacuum in the presence of 0.2 percent of paramethoxyphenol as a polymerization inhibitor, the resulting product is converted to the sodium salt by neutralization with sodium hydroxide. The diluted crude salt is purified by multiple extraction-distillation with the solvents n-butanol and n-hexane, after which the resulting sodium 9-(and 10-) acrylamidostearyl sulfate is diluted with water to form a 20 percent aqueous solution. The critical micelle concentration in pure water at 25° C. of the purified product is found to be 0.047 percent by weight. A sufficient quantity of the sodium 9-(and 10-) acrylamidostearyl sulfate to provide 71 percent coverage is added to a latex of a copolymer of 60 percent of styrene and 40 percent of butadiene having a solids content of 29.3 percent, an average particle diameter of 0.134 micron, and a stability index of less than 1 minute, determined on a sample diluted with water to 25 percent solids. Before in situ polymerization of the adsorbed sodium 9-(and 10-) acrylamidostearyl sulfate the stability index is found to be 58 minutes determined on a sample diluted with water to 25 percent solids. After in situ polymerization in a nitrogen atmosphere with 0.2 percent, based on solids content of the latex, of sodium persulfate as the initiator and heating with agitation at 70° C. for 15 hours, the resulting product has a stability index of 88 minutes, determined on a sample at 25 percent solids.

EXAMPLE 8

To another portion of the starting latex for Example 7 is added sufficient sodium 9-(and 10-) acrylamidostearyl sulfate to provide 80 percent coverage and 1.6 percent, based on the solids content of the latex, of 9-(and 10-) acrylamidostearyl alcohol. Before in situ polymerization the stability index is 28 minutes under the same conditions as Example 7. After in situ polymerization in the same manner as in Example 7, the stability index is found to be 75 minutes.

EXAMPLE 9

A latex of a copolymer of 60 percent of n-butyl acrylate, 38 percent of methyl methacrylate and 2 percent of methacrylic acid is prepared from the constituent monomers by free-radical polymerization at 70° C. using as the catalyst hydrogen peroxide activated by ferric nitrate and as the emulsion stabilizer 0.425 percent of N,N-dimethylaminoethyl methacrylate hydrochloride and 0.05 percent of dodecylamine hydrochloride, both percentages being based on the weight of the constituent monomers. The latex thus obtained has a solids content of 50.3 percent, a pH of 2.3, and an average particle diameter of 0.131 micron. To a portion of the latex product is added 0.5 percent by weight of 9-(and 10-) acrylamidostearyl amine hydrochloride and to another portion 1 percent of the amine hydrochloride. After the addition of hydrogen peroxide catalyst thereto, the resulting latex products are subjected to agitation at 70° C. for about 7 hours in a nitrogen atmosphere. The adhesive properties of the resulting latex products are found to be considerably improved as compared with the latex to which 0.5 percent of 9-(and 10-) acrylamidostearyl amine hydrochloride has been added but which has not been polymerized in situ, or as compared with the latex to which nothing has been added. The critical micelle concentration in pure water at 25° C. of the 9-(and 10-) acrylamidostearyl amine hydrochloride is found to be 0.01 percent by weight.

EXAMPLE 10

To another portion of latex 1A is added a sufficient quantity to provide 80 percent coverage of a surfactant prepared by the reaction of ethylene oxide with 10-p-styrylundecanoic acid in the ratio of 10 moles of ethylene oxide per mole of the acid. The surfactant is polymerized in situ in a nitrogen atmosphere with 0.2 percent, based on the weight of polymer solids in the latex, of sodium persulfate as the initiator and heating with agitation at 70° C. for 20 hours. The resulting latex product shows considerable improvement in dispersion stability when compared with the mixture of surfactant and latex 1A before in situ polymerization and even greater improvement when compared with the starting latex, Latex 1A.

That which is claimed is:

1. A method for preparing aqueous dispersions of improved stability comprising adsorbing at least one polymerizable surfactant on preformed substantially water-insoluble particles of a latex of natural rubber or polymers of ethylenically unsaturated monomers in sufficient amount to provide from about 50 percent to about 100 percent surface coverage and subsequently polymerizing in place the adsorbed polymerizable surfactant, said polymerizable surfactant being an ethylenically unsaturated compound which has a hydrophobic portion which is predominantly hydrocarbon, a hydrophilic portion which is anionic, cationic or non-ionic and said polymerizable surfactant being soluble in water to an extent of at least 1 percent by weight, being capable of reducing the air/water surface tension to less than 40 dynes per centimeter at a concentration of 0.1 percent by weight in water as determined at 25° C. and exhibiting a critical micelle concentration in pure water of less than 0.5 mole per liter.

2. The method of claim 1 in which the amount of the polymerizable surfactant is sufficient to provide at least 70 percent surface coverage.

3. The method of claim 1 in which the hydrophilic portion of the polymerizable surfactant is anionic.

4. The method of claim 1 in which the hydrophilic portion of the polymerizable surfactant is cationic.

5. The method of claim 1 in which the hydrophilic portion of the polymerizable surfactant is non-ionic.

6. The method of claim 1 in which the polymerizable surfactant is an acrylamido compound.

7. The method of claim 1 in which the polymerizable surfactant is a styryl compound.

8. The method of claim 1 in which the polymerizable surfactant is a substituted aromatic vinyl ketone.

9. The method of claim 1 in which the polymerizable surfactant is a sulfo ester of an α-methylene carboxylic acid.

10. The method of claim 2 in which the polymerizable surfactant is a salt of allyl-α-sulfopalmitic acid.

11. The method of claim 2 in which the hydrophilic portion is a carboxylic acid group or a salt thereof.

12. The method of claim 3 in which the polymerizable surfactant is a salt of N,N-dimethylaminoethyl methacrylate and a salt-forming acid.

13. The method of claim 4 in which the hydrophilic portion is a polyoxyethylene ester of a carboxylic group.

14. The method of claim 5 in which the polymerizable surfactant is 9-acrylamidostearic acid, 10-acrylamidostearic acid, a mixture thereof, or a salt thereof.

15. The method of claim 5 in which the polymerizable surfactant is 9-acrylamidostearyl sulfate, 10-acrylamidostearyl sulfate, a mixture thereof or an alkali metal salt or an ammonium salt thereof.

16. An aqueous dispersion of polymeric particles of natural rubber or polymers of ethylenically unsaturated monomers having on the surface of said particles a polymer of a polymerizable surfactant; said polymerizable surfactant before polymerization being an ethylenically unsaturated compound which has a hydrophobic portion which is predominantly hydrocarbon, a hydrophilic portion which is anionic, cationic or nonionic and said polymerizable surfactant being soluble in water to an extent of at least 1 percent by weight, being capable of reducing the air/water surface tension to less than 40 dynes per centimeter at a concentration of 0.1 percent by weight in water as determined at 25° C. and exhibiting a critical micelle concentration in pure water of less than 0.5 mole per liter.

References Cited

UNITED STATES PATENTS

| | | | |
|---|---|---|---|
| 3,297,786 | 1/1967 | Horowitz | 260—857 |
| 3,363,029 | 1/1968 | Verdol et al. | 260—885 |
| 3,404,114 | 10/1968 | Snyder et al. | 260—29.6 |
| 3,434,989 | 3/1969 | Fantl et al. | 260—23.7 |

WILLIAM H. SHORT, Primary Examiner

E. A. NIELSEN, Assistant Examiner

U.S. Cl. X.R.

260—23 EM, 29.6 RW, 29.6 PM, 29.7 UP